(12) United States Patent
Naderhirn et al.

(10) Patent No.: US 7,001,169 B2
(45) Date of Patent: Feb. 21, 2006

(54) MACHINE FOR PROCESSING SYNTHETIC MATERIALS

(75) Inventors: Helmut Naderhirn, Perg (AT); Herbert Gruber, Pregarten (AT)

(73) Assignee: Engel Maschinenbau Gesellschaft m.b.H., Schwetberg (AT)

( * ) Notice: Subject to any disclaimer, the term of this patent is extended or adjusted under 35 U.S.C. 154(b) by 418 days.

(21) Appl. No.: 10/136,963

(22) Filed: May 1, 2002

(65) Prior Publication Data

US 2002/0192324 A1    Dec. 19, 2002

(30) Foreign Application Priority Data

May 11, 2001    (AT)    ................ 375/2001 U

(51) Int. Cl.
*B29C 45/84*    (2006.01)
(52) U.S. Cl. ...................... 425/136; 425/153
(58) Field of Classification Search ................ 425/136, 425/138, 150, 151, 153; 100/342
See application file for complete search history.

(56) References Cited

U.S. PATENT DOCUMENTS 4,737,093 A * 4/1988 Hori et al. ................ 425/151
6,164,947 A * 12/2000 Miyahara ................ 425/136

FOREIGN PATENT DOCUMENTS

| JP | 62074618 | 4/1987 |
| JP | 63176120 | 7/1988 |
| JP | 01241400 | 9/1989 |
| JP | 05131497 | 5/1993 |

* cited by examiner

*Primary Examiner*—James P. Mackey
(74) *Attorney, Agent, or Firm*—Notaro & Michalos PC

(57) ABSTRACT

An injection moulding machine with a vertically movable mould-clamping plate, an electrical drive motor for the movable mould-clamping plate. A control unit for the drive motor, a machine control unit and a safety device to prevent unintentional movement of the movable mould-clamping plate are also provided. The machine control unit activates the retaining device when a movement of the movable mould-clamping plate is indicated without a corresponding drive signal.

7 Claims, 2 Drawing Sheets

MACHINE FOR PROCESSING SYNTHETIC MATERIALS

The invention relates to a machine for processing synthetic materials, especially an injection moulding machine with a vertically movable mould-clamping plate, an electrical drive motor for the movable mould-clamping plate, a control unit for the drive motor, a machine control unit and a safety device to prevent unintentional movement of the movable mould-clamping plate, which comprises at least one retaining device and a movement sensor.

The object of the invention is equip a machine for processing synthetic materials of this type with an improved safety device, which prevents the movable mould-clamping plate from being moved by gravity into the closed position.

The object of the invention is achieved in that the machine control unit activates the at least one retaining device when a movement of the movable mould-clamping plate is indicated to the machine control unit without a corresponding drive signal.

One embodiment of the invention envisages that the retaining device is activated by the machine control unit when a movement of the movable mould-clamping plate is indicated to the machine control unit, without the machine control unit having issued a signal to the control unit for the drive motor to move the movable mould-clamping plate.

A further embodiment of the invention envisages that the retaining device is activated when a movement of the movable mould-clamping plate is indicated to the machine control unit, without a rotation of a driving wheel of the drive motor having been signalled to the machine control unit.

Another embodiment of the invention envisages that the drive motor has a driving wheel and the movable mould-clamping plate is provided with a drive which has a drive wheel, and that the machine control unit monitors the synchronous running of the driving wheel and the driving wheel and activates the retaining device in the event of any deviation from the synchronous running of the wheels.

One embodiment is described below with reference to the figures in the attached diagrams.

Figure 1:
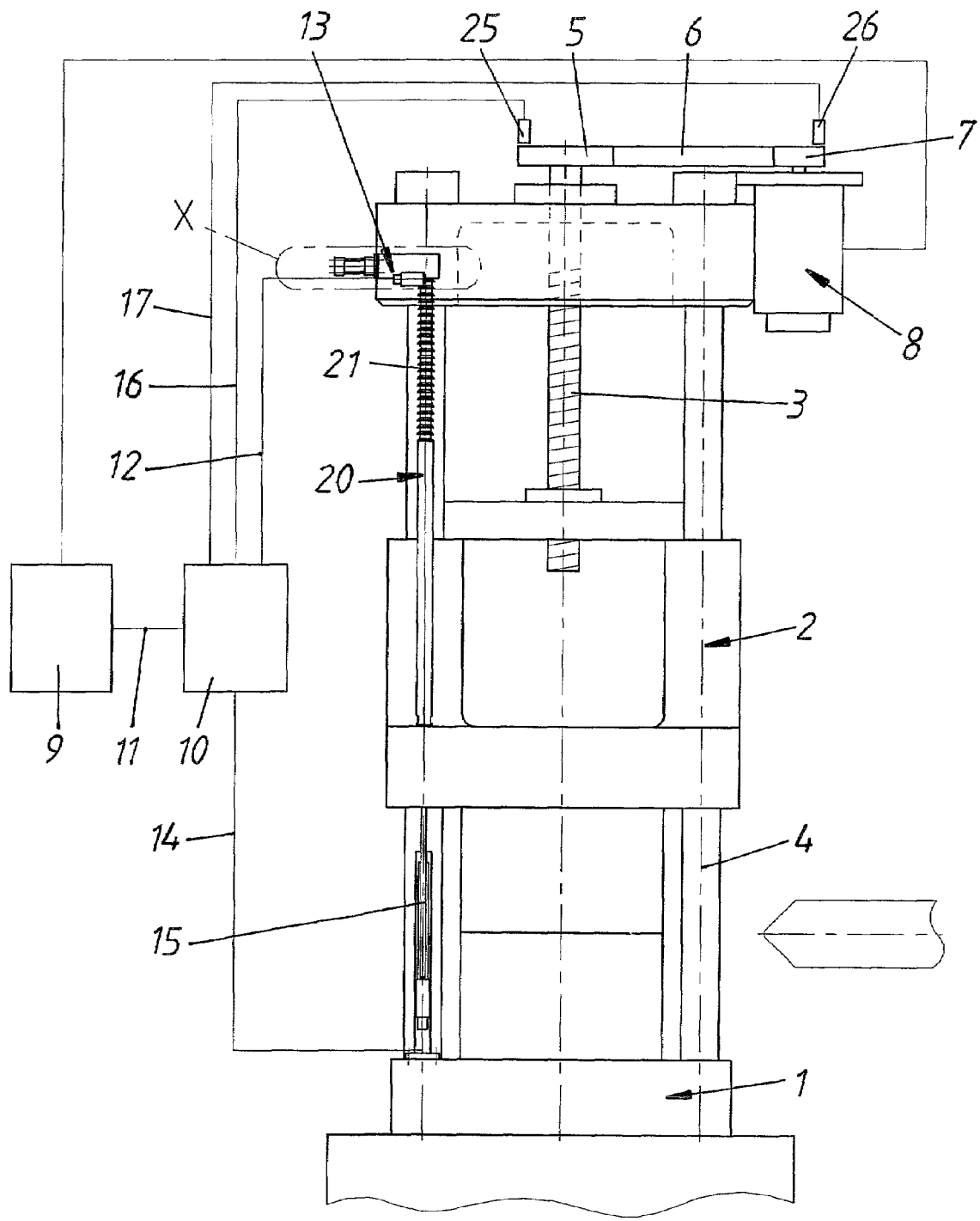
Figure 2:
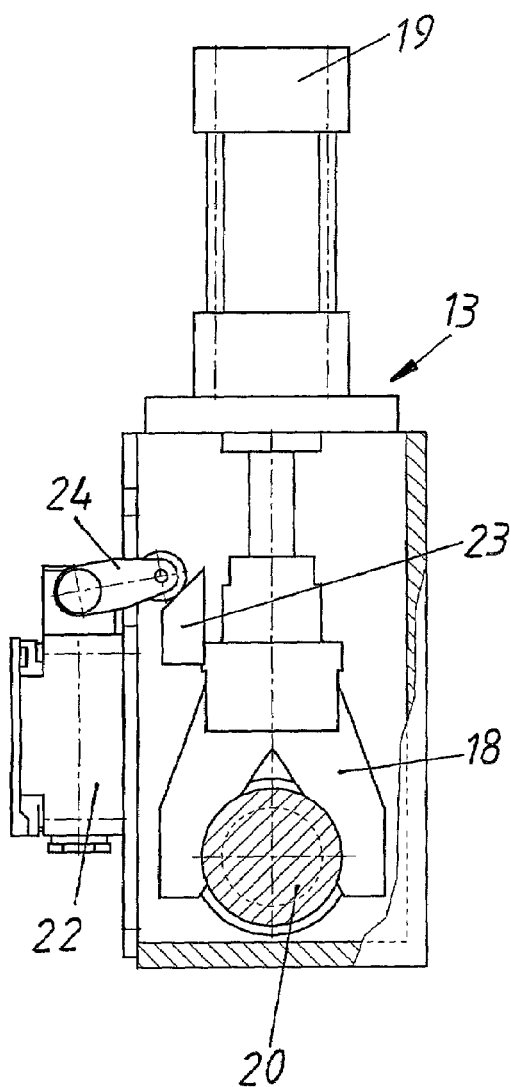
Figure 3:
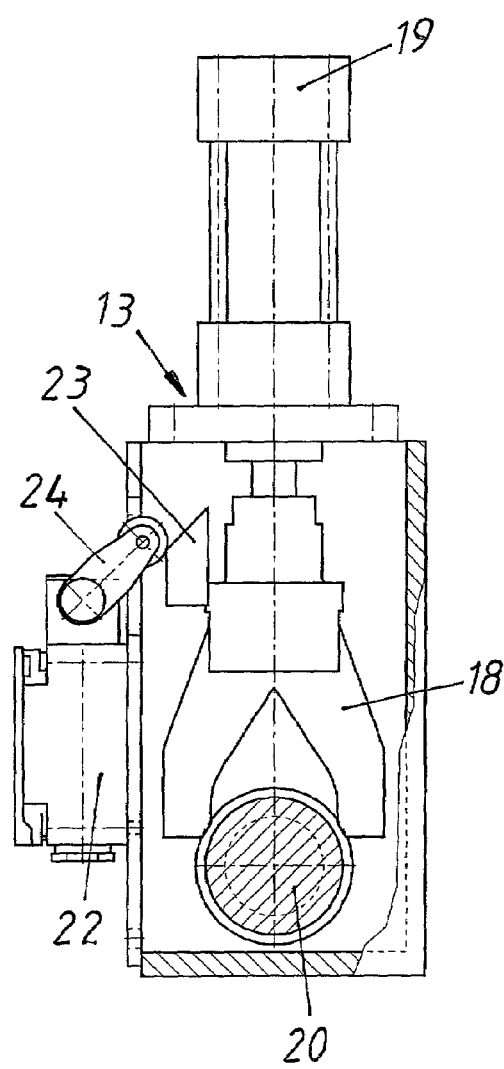

FIG. 1 shows a schematic outline of the machine for processing synthetic materials according to the invention, FIG. 2 shows a plan view of the retaining device in the locked position and FIG. 3 shows a plan view of the retaining device in the unlocked position.

In a conventional manner, the machine for processing synthetic materials according to the invention, which is designed as an injection moulding machine, has a stationary, lower mould-clamping plate 1 and a movable mould-clamping plate 2, which is guided vertically on shafts 4. The movement of the movable mould-clamping plate 2 occurs via a spindle drive 3. The spindle drive 3 has a drive wheel 5, which is coupled to a driving wheel 7 of an electric drive motor 8 via a drive belt 6. The drive motor 8 is controlled from a control unit 9, which is designed as a power module.

The control unit 9 is controlled via a line 11 from the machine control unit 10.

The machine control unit 10 is connected to the retaining device 13 via a line 12.

In the embodiment shown, the machine control unit 10 is connected via a line 14 to a position sensor 15 and via lines 16, 17 to the drive wheel 5 of the spindle drive 3 and the driving wheel 7 of the electric drive motor 8.

The retaining device 13 comprises a horizontally movable slide 18, which is pressurised by a pneumatic cylinder 19. The slide 18 is designed at its free end as a claw which engages in annular grooves 21 of a retaining rod 20, which is secured to the movable mould-clamping plate 2.

Furthermore, an end switch 22 is provided on the retaining device 13, which determines the two end positions of the slide 18 by means of a feeler arm 24 via an operating cam 23 attached to the slide 18.

The retaining device 13 could, however, also be formed by a friction brake.

The retaining device 13 can be activated in several ways. For example, the machine control unit 10 identifies a movement of the movable mould-clamping plate 2 via the position sensor 15, without the machine control unit 10 having issued a command to activate the control unit 9 for the drive motor 8. This leads to an activation of the retaining device 13 by the machine control unit 10.

Moreover, with the assistance of the rotational speed sensors 25, 26, the machine control unit 10 can determine that the drive wheel 5 and the driving wheel 7 are not running in a synchronous manner, where synchronous is taken to mean with a predetermined and mutually balanced ratio of the rotational speeds of drive wheel 5 and driving wheel 7. In this case also, a command is issued by the machine control unit 10 to the retaining device 13, in order to activate the slide 18 and bring it into the locked position with the retaining rod 20.

With the assistance of the position sensor 15, the machine control unit 10 can also determine a movement of the movable mould-clamping plate 2 and can, at the same time, obtain information via the rotational speed sensor 26 that the driving wheel 7 of the drive motor 8 is not rotating. This information also leads to the activation of the retaining device 13 via the machine control unit 10 and to the locking of the slide 18 in an annular groove 21 of the retaining rod 20.

The drive for the movable mould-clamping plate 2 could also be provided by a linear drive unit.

What is claimed is:

1. An injection molding machine for processing synthetic materials having a vertically movable mold-clamping plate, an electrical drive motor for moving the movable mold-clamping plate, a motor control unit for the drive motor, the drive motor producing a drive signal when moving the movable mold-clamping plate, a machine control unit and a safety device means for preventing unintentional movement of the movable mold-clamping plate, the safety device means comprising at least one retaining device for controllably preventing movement of the movable mold-clamping plate the machine control unit being connected to the drive motor and a movement sensor being connected with the machine control unit, the machine control unit including means for activating the at least one retaining device to prevent movement of the movable mold-clamping plate when a movement of the movable mold-clamping plate is indicated to the machine control unit by the movement sensor in the absence of a corresponding drive signal from the drive motor.

2. An injection molding machine for processing synthetic materials according to claim 1, wherein the machine control unit includes means for activating the retaining device when a movement of the movable mold-clamping plate is indicated to the machine control unit without the machine control unit having issued a signal to the control unit for the drive motor to move the movable mold-clamping plate.

3. An injection molding machine for processing synthetic materials according to claim 1, wherein the machine control unit includes means for activating the retaining device when a movement of the movable mold-clamping plate is indicated to the machine control unit in the absence of an indication to the machine control unit of a rotation of a driving wheel of the drive motor.

4. An injection molding machine for processing synthetic materials according to claim 1, wherein the drive motor has a driving wheel and the movable mold-clamping plate is provided with a drive having a drive wheel, the machine control unit including means for monitoring the synchronous running of the driving wheel and the drive wheel and means for activating the retaining device upon a deviation from synchronous running of the drive and driving wheels.

5. An injection molding machine for processing synthetic materials according to claim 1, further comprising a position sensor connected to the machine control unit, the position sensor measuring a distance between the movable mold-clamping plate and a stationary mold-clamping plate.

6. An injection molding machine for processing synthetic materials according to claim 1, wherein the at least one retaining device is formed by a catch mechanism having a slide which locks into an annular groove of a retaining rod connected to the movable mold-clamping plate.

7. An injection molding machine for processing synthetic materials according to claim 1, wherein the at least one retaining device is formed by a friction brake.

* * * * *